US012630907B2

(12) United States Patent
Kuwabara et al.

(10) Patent No.: US 12,630,907 B2
(45) Date of Patent: **\*May 19, 2026**

(54) PRODUCTION METHOD OF ALLOY MEMBER, ALLOY MEMBER, AND PRODUCT USING ALLOY MEMBER

(71) Applicant: Proterial, Ltd., Tokyo (JP)

(72) Inventors: Kousuke Kuwabara, Tokyo (JP); Shuho Koseki, Tokyo (JP)

(73) Assignee: Proterial, Ltd., Tokyo (JP)

( * ) Notice: Subject to any disclaimer, the term of this patent is extended or adjusted under 35 U.S.C. 154(b) by 521 days.

This patent is subject to a terminal disclaimer.

(21) Appl. No.: 17/908,529

(22) PCT Filed: Jan. 29, 2021

(86) PCT No.: PCT/JP2021/003382
§ 371 (c)(1),
(2) Date: Aug. 31, 2022

(87) PCT Pub. No.: WO2021/176910
PCT Pub. Date: Sep. 10, 2021

(65) Prior Publication Data
US 2023/0122004 A1 Apr. 20, 2023

(30) Foreign Application Priority Data

Mar. 3, 2020 (JP) ................................ 2020-035862

(51) Int. Cl.
*C22C 30/00* (2006.01)
*B22F 10/28* (2021.01)
(Continued)

(52) U.S. Cl.
CPC .............. *C22C 30/00* (2013.01); *B22F 10/28* (2021.01); *B33Y 80/00* (2014.12); *C22C 1/04* (2013.01);
(Continued)

(58) Field of Classification Search
CPC ......... C22C 30/00; C22C 1/04; C22C 1/0433; B22F 10/28; B22F 2203/11;
(Continued)

(56) References Cited

U.S. PATENT DOCUMENTS 11,492,685 B2 * 11/2022 Fujieda ................... B22F 10/64
2019/0039139 A1 * 2/2019 Ljungblad ............. B32B 15/012
(Continued)

FOREIGN PATENT DOCUMENTS

CN 106119835 11/2016
EP 3527680 8/2019
(Continued)

OTHER PUBLICATIONS

Zhaobing Cai et al., "Microstructure and wear resistance of laser cladded Ni—Cr—Co—Ti—V high-entropy alloy coating after laser remelting processing", Optics & Laser Technology, Sep. 19, 2017, pp. 276-281, vol. 99.

(Continued)

*Primary Examiner* — John A Hevey
(74) *Attorney, Agent, or Firm* — JCIPRNET

(57) ABSTRACT

A production method for an alloy member having mainly high hardness and high resistance to corrosion and produced by an additive manufacturing method, the alloy member, and a product using the alloy member are provided. The production method of an alloy member includes: an additive manufacturing step of forming a shaped member through an additive manufacturing method using an alloy powder containing elements Co, Cr, Fe, Ni, and Ti each in a range of 5 atom % to 35 atom % and containing Mo in a range exceeding 0 atom % and 8 atom % or less, the remainder being unavoidable impurities; and a heat treatment step of holding the shaped member in a temperature range higher than 500° C. and lower than 900° C. directly after the (Continued)

PREPARE SHAPED MEMBER A

SOLUTION HEAT TREATMENT STEP (SHAPED MEMBER B) — S40

SURFACE LAYER-ADDING AND SHAPING STEP (SHAPED MEMBER D) — S65

AGING HEAT TREATMENT STEP — S70

PREPARE SHAPED MEMBER B

SURFACE LAYER-ADDING AND SHAPING STEP (SHAPED MEMBER D) — S65

AGING HEAT TREATMENT STEP — S70 additive manufacturing step without undergoing a step of holding the shaped member in a temperature range of 1080° C. to 1180° C.

3 Claims, 10 Drawing Sheets

(51) Int. Cl.

| | |
|---|---|
| *B33Y 10/00* | (2015.01) |
| *B33Y 40/20* | (2020.01) |
| *B33Y 70/00* | (2020.01) |
| *B33Y 80/00* | (2015.01) |
| *C22C 1/04* | (2023.01) |
| *C22F 1/16* | (2006.01) |
| *F04D 29/02* | (2006.01) |
| *F04D 29/28* | (2006.01) |

(52) U.S. Cl.

CPC .............. *C22F 1/16* (2013.01); *F04D 29/023* (2013.01); *F04D 29/284* (2013.01); *B22F 2203/11* (2013.01); *B22F 2301/15* (2013.01); *B22F 2301/205* (2013.01); *B22F 2301/35* (2013.01); *B22F 2304/054* (2013.01); *B22F 2998/10* (2013.01); *B22F 2999/00* (2013.01); *B33Y 10/00* (2014.12); *B33Y 40/20* (2020.01); *B33Y 70/00* (2014.12); *F05D 2230/40* (2013.01); *F05D 2300/17* (2013.01)

(58) Field of Classification Search

CPC ............ B22F 2301/15; B22F 2301/205; B22F 2301/35; B22F 2304/054; B22F 2998/10; B22F 2999/00; B22F 10/64; C22F 1/16; C22F 1/00; F04D 29/023; F04D 29/284; B33Y 10/00; B33Y 40/20; B33Y 70/00; B33Y 80/00; F05D 2230/40; F05D 2300/17; Y02P 10/25

See application file for complete search history.

(56) References Cited

U.S. PATENT DOCUMENTS

| | | | |
|---|---|---|---|
| 2019/0047049 A1 | 2/2019 | Fujieda et al. | |
| 2019/0226058 A1* | 7/2019 | Fujieda | .............. F04D 29/023 |
| 2022/0331870 A1* | 10/2022 | Kuwabara | .............. B22F 10/28 |
| 2024/0001445 A1* | 1/2024 | Koseki | ................... B22F 10/64 |

FOREIGN PATENT DOCUMENTS

| | | | |
|---|---|---|---|
| WO | 2017138191 | 8/2017 | |
| WO | 2019031577 | 2/2019 | |
| WO | WO-2019031577 A1 * | 2/2019 | ............... B22F 1/00 |

OTHER PUBLICATIONS

"Search Report of Europe Counterpart Application", issued on Sep. 8, 2023, p. 1-p. 12.
"Written Opinion of Singapore Counterpart Application", issued on Feb. 9, 2024, p. 1-p. 8.
"International Search Report (Form PCT/ISA/210) of PCT/JP2021/003382", mailed on Mar. 23, 2021, with English translation thereof, pp. 1-4.

\* cited by examiner

PRODUCTION METHOD OF ALLOY MEMBER, ALLOY MEMBER, AND PRODUCT USING ALLOY MEMBER

CROSS-REFERENCE TO RELATED APPLICATION

This application is a 371 of international application of PCT application serial no. PCT/JP2021/003382, filed on Jan. 29, 2021, which claims the priority benefit of Japan application no. 2020-035862, filed on Mar. 3, 2020. The entirety of each of the above-mentioned patent applications is hereby incorporated by reference herein and made a part of this specification.

TECHNICAL FIELD

The present invention relates to a production method of an alloy member produced through an additive manufacturing method, an alloy member obtained through this production method, and a product using the alloy member.

BACKGROUND ART

In recent years, high-entropy alloys (HEAs) have been proposed as alloys of a new technical idea different from alloys (for example, alloys obtained by adding trace amounts of plural kinds of sub-component elements to 1 to 3 kinds of main component elements) of technical ideas in the related art. HEAs are defined as alloys consisting of 5 or more kinds of principal metal elements (respectively 5 to 35 atom %), and are known to exhibit characteristics (a) to (d) below. In addition, an alloy concept of a multi-principal element alloy (MPEA) having a plurality of principal elements and allowing existence of multiple phases has also been proposed. In the present application, HEAs and MPEAs are treated as the same concept, and both are collectively referred to as HEAs.

Examples of advantages of HEAs include (a) stabilization of a mixed state due to a negative increase in a mixed entropy term in the Gibbs free energy equation, (b) a diffusion delay due to a complex fine structure, (c) a decrease in temperature dependence, which is a mechanical property, or an increase in hardness due to high lattice strain caused by the difference in sizes of constituent atoms, and (d) an improvement in corrosion resistance due to a complex effect (also referred to as a cocktail effect) due to coexistence of various elements.

Here, Patent Literature 1 discloses an alloy member containing elements Co, Cr, Fe, Ni, and Ti each in a range of 5 atom % or more to 35 atom % or less and containing Mo in a range exceeding 0 atom % and 8 atom % or less, the remainder being unavoidable impurities, in which minute particles having an average particle diameter of 100 nm or less are dispersed and precipitate in parent phase crystal grains.

According to Patent Literature 1, it is thought that a fine structure in which minute particles are dispersed and precipitate in parent phase crystal grains is obtained by subjecting a shaped member produced through an additive manufacturing method to a predetermined heat treatment, and as a result, an alloy member having improved tensile strength, significantly improved ductility, and improved corrosion resistance can be provided.

CITATION LIST

Patent Literature

[Patent Literature 1]
    PCT International Publication No. WO 2019/031577

SUMMARY OF INVENTION

Technical Problem

According to the technique of Patent Literature 1, an alloy member having excellent corrosion resistance and mechanical properties such as tensile strength or ductility can be obtained. However, further improvement in hardness is required to apply this alloy member to a severe environment where wear resistance is required.

As described above, an objective of the present invention is to provide an alloy member which is produced through an additive manufacturing method using an alloy powder, has excellent corrosion resistance and mechanical properties, and has wear resistance due to further improved hardness, and a production method thereof. In addition, another objective of the present invention is to provide a production method of an alloy member having higher mechanical properties. Furthermore, still another objective of the present invention is to provide a product having excellent corrosion resistance and wear resistance and excellent mechanical properties using this alloy member.

Solution to Problem

A production method of an alloy member of the present invention is a production method of an alloy member including: an additive manufacturing step of forming a shaped member through an additive manufacturing method using an alloy powder containing elements Co, Cr, Fe, Ni, and Ti each in a range of 5 atom % or more to 35 atom % or less and containing Mo in a range exceeding 0 atom % and 8 atom % or less, the remainder being unavoidable impurities (the shaped member obtained through such a step is regarded as a shaped member A); and an aging heat treatment step of holding the shaped member (shaped member A) obtained through the additive manufacturing step in a temperature range higher than 500° C. and lower than 900° C. in a state where a melt solidification structure is provided at least in a surface layer part.

A production method of an alloy member according to another aspect of the present invention is a production method of an alloy member including the following steps between the additive manufacturing step and the aging heat treatment step: a solution heat treatment step of heating the shaped member (shaped member A) formed through the additive manufacturing step and holding the shaped member in a temperature range of 1080° C. or more to 1180° C. or less; a cooling step of cooling the shaped member after the solution heat treatment step (a shaped member obtained through such a step is regarded as a shaped member B); and then a remelting and resolidifying step of melting and solidifying the surface layer part of the shaped member (shaped member B) again (a shaped member obtained through such a step is regarded as a shaped member C).

A production method of an alloy member according to still another aspect of the present invention is a production method of an alloy member including the following steps between the additive manufacturing step and the aging heat treatment step: a solution heat treatment step of heating the shaped member (shaped member A) and holding the shaped member in a temperature range of 1080° C. or more to 1180° C. or less; a cooling step of cooling the shaped member after the solution heat treatment step (a shaped member obtained through such a step is regarded as a shaped member B); and then a surface layer-adding and shaping step of forming a melt solidification layer on the surface layer part of the shaped member (shaped member B) that has undergone the cooling step, through the additive manufacturing method using the alloy powder (a shaped member obtained through such a step is regarded as a shaped member D).

An alloy member according to the present invention is an alloy member including: elements Co. Cr, Fe, Ni. and Ti each in a range of 5 atom % or more to 35 atom % or less; Mo in a range exceeding 0) atom % and 8 atom % or less; and unavoidable impurities as a remainder, in which the alloy member comprises a microcell structure with an average particle diameter of 10 μm or less at least in crystal grains of a surface layer part, a boundary part of the microcell structure has a dislocation having a surface density higher than that inside the microcell structure, and ultrafine particles having an average particle diameter of 50 nm or less are dispersed and precipitate at least inside the microcell structure.

The present invention is a product using the above-described alloy member. This product may be an impeller of a fluid machine, a screw of an injection molding machine, or a die.

Advantageous Effects of Invention

According to the present invention, an alloy member having excellent corrosion resistance and mechanical properties and having wear resistance due to improved hardness, and a production method of the same can be provided. In addition, a production method of an alloy member having higher mechanical properties can be provided. Furthermore, a product having excellent corrosion resistance and wear resistance and excellent mechanical properties using this alloy member can be provided.

DESCRIPTION OF EMBODIMENTS

[Basic Idea of Present Invention]

Figure 1:
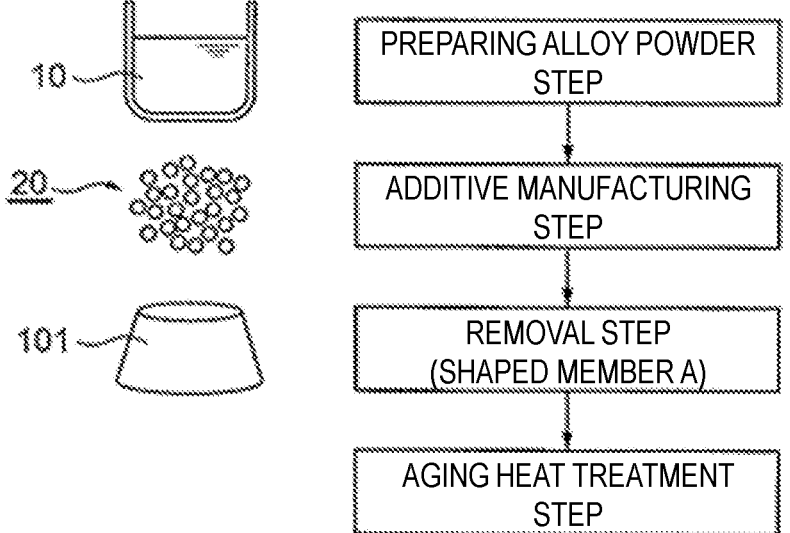
FIG. 1 is a process diagram illustrating an example of a production method of an alloy member according to the present invention.

First, the present inventors or the like have conducted extensive studies on an alloy composition and a shape control method to develop a high-entropy alloy member having excellent shape controllability and ductility without sacrificing the characteristics of high-entropy alloys (HEAs). As a result, by forming an additively manufactured member through an additive manufacturing method using a powder of a Co—Cr—Fe—Ni–Ti—Mo alloy, an alloy member having excellent tensile strength, ductility, and corrosion resistance and having better shape controllability than an ordinarily forged HEA member in the related art can be obtained. That is, it is determined that a fine structure in which minute particles having an average particle diameter of 100 nm or less are dispersed and precipitate is formed by conducting a solution heat treatment at 1080° C. or more to 1180° C. or less to significantly improve both the tensile strength and the ductility. Specifically, it has been confirmed that a near net shape alloy member having favorable mechanical properties (for example, a tensile strength of 1,100 MPa or more and a breaking elongation of 10% or more) can be obtained. In addition, it has been confirmed that the alloy member also exhibits a high pitting corrosion generating potential and has excellent corrosion resistance. However, it has been found that, when a wear resistance test is performed for a mechanical device in which this alloy member is used, it is desirable for the alloy member to have further improved wear resistance, that is, improved hardness under severe conditions such as use in a sliding part. The alloy member in the present invention is a metal additively manufactured member produced through an additive manufacturing method (also referred to as an additive production method), and is sometimes simply referred to as a shaped member below.

Therefore, the present inventors or the like have repeatedly investigated and studied the relationship between various characteristics and a fine structure of an alloy member derived from the production method. As a result, they have found that the hardness can be improved by performing an aging treatment step (referred to as an aging heat treatment in the present invention) of holding the shaped member (hereinafter referred to as a shaped member A), which has been shaped, in a temperature range higher than 500° C. and lower than 900° C. in a state where a melt solidification structure is provided at least in a surface layer part without undergoing a solution heat treatment at 1080° C. or more and 1180° C. or less, and have come up with the present invention. This point is the basic common idea of the present invention. As a result of investigating the mechanism for improving the hardness, it has been confirmed that a cell-shaped region (referred to as a microcell structure in the present invention) having an average particle diameter of 10 μm or less which is finely divided by a network of dislocations having a higher density than the surroundings is generated inside crystal grains consisting of columnar crystals produced through an additive manufacturing method and that ultrafine particles having an average particle diameter of 50 nm or less which are smaller than minute particles in parent phase crystal grains other than the microcell structure are generated in the microcell structure through an aging heat treatment. Here, the dislocations are linear crystal defects contained in a crystal and are sites where an atomic arrangement is locally changed. It is thought that the hardness is increased by generation of nanoscale ultrafine particles with high-density dislocations. These dislocations can be identified by observation through various kinds of electron microscopy (for example, transmission electron microscopy (TEM) and scanning transmission electron microscopy (STEM)).

As described above, a first embodiment of the production method of an alloy member of the present invention is as follows.

(i) A shaped member A is obtained through an additive manufacturing method using an alloy powder containing elements Co, Cr, Fe. Ni, and Ti each in a range of 5 atom % or more to 35 atom % or less. Mo in a range exceeding 0 atom % and 8 atom % or less, and unavoidable impurities as a remainder to subject the shaped member A to an aging heat treatment in which the shaped member A is held in a temperature range higher than 500° C. and lower than 900° C. in a state where a melt solidification structure is provided at least in a surface layer part. That is, the present invention is characterized in that the shaped member which has been additively manufactured is directly subjected to an aging heat treatment without undergoing a solution heat treatment step, whereby the hardness is improved. Although the ductility of this alloy member is lower than in the case of undergoing a solution heat treatment step, the alloy member has excellent tensile strength. In addition, the alloy member also has excellent corrosion resistance and is also particularly suitable for applications requiring wear resistance due to improved hardness. This point is different from Patent Literature 1.

The basic of the production method of the present invention is as described above. However, as another production method of the present invention, there is an aspect of additionally carrying out a new melting and solidifying step on a preliminarily obtained shaped member.

(ii) As a second embodiment, the preliminarily obtained shaped member A is subjected to a solution heat treatment of holding the temperature at 1080° C. or more to 1180° C. or less. Accordingly, a structure in which minute particles having an average particle diameter of 50 nm to 100 nm are dispersed and precipitate in parent phase crystal grains is formed, and a shaped member B having improved mechanical properties is obtained. Thereafter, a shaped member C (hereinafter sometimes referred to as a remelted and reshaped member C) obtained by the surface layer part of the shaped member B is melted and solidified again using a laser beam or the like is obtained. Thereafter, the shaped member C is subjected to the above-described aging heat treatment in a state where a melt solidification structure is provided at least in the surface layer part, and ultrafine particles having an average particle diameter of 50 nm or less which are smaller than the minute particles in the parent phase crystal grains are dispersed and precipitate in a microcell structure of the surface layer part to impart hardness. Therefore, according to this embodiment, in addition to the first embodiment, it is possible to obtain an alloy member having higher mechanical properties and improved hardness of the surface layer part.

(iii) As a third embodiment, an additive manufacturing method (additive remanufacturing step) is carried out on the shaped member B preliminarily obtained in the above-described method in (ii) to obtain a shaped member D (hereinafter sometimes referred to as a surface layer-added and shaped member D) obtained by forming a new melt solidification layer in the surface layer part of the shaped member B. Thereafter, the shaped member D is subjected to the above-described aging heat treatment in a state where a melt solidification structure is provided at least in the surface layer part, and ultrafine particles having an average particle diameter of 50 nm or less which are smaller than the minute particles in the parent phase crystal grains are dispersed and precipitate in a microcell structure of the surface layer part to impart hardness. Therefore, according to this embodiment, it is also possible to obtain an alloy member having higher mechanical properties and improved hardness of the surface layer part.

In the above-described production methods in (ii) and (iii), an additional melting and solidifying step is selectively performed on a preliminarily obtained (produced) shaped member. The remelted and reshaped member C in the second embodiment (ii) and the surface layer-added and shaped member D in the third embodiment (iii) have common points with the shaped member A in the first embodiment (i) in that they are solidified structures in which a microcell structure is provided in at least a surface layer part and an aging heat treatment is performed without undergoing a solution treatment. Such production methods correspond to the production methods for an alloy member having higher mechanical properties in the present invention. According to these production methods, it is possible to selectively manufacture alloy members according to applications such as an application requiring mainly high wear resistance or an application requiring not only wear resistance but also mechanical properties. Accordingly, as the production process is shortened, the variety of products is expanded, which is beneficial for production management.

In addition, the following improvements or changes can be made in the above-described production method of an alloy member.

(iv) A laser beam or an electron beam can be used as a heat source used in the additive manufacturing method in the additive manufacturing step and the additive remanufacturing step. Accordingly, additive manufacturing can be performed in an inert gas atmosphere or in a vacuum. Therefore, mixing of impurities due to an atmosphere such as oxygen or nitrogen in an alloy member can be reduced.

(v) As a material supply method of the additive manufacturing method in the additive manufacturing step and the additive remanufacturing step, a supply method using a powder bed and a direct metal deposition method, such as laser metal deposition method, in which a powder is directly ejected to a molten part can be used. Accordingly, it is possible to deal with both a shaping method having excellent degree of freedom in shape by a powder bed method and local shaping by a direct metal deposition method.

In addition, the alloy member of the present invention is (vi) an alloy member including: elements Co, Cr, Fe, Ni, and Ti each in a range of 5 atom % or more to 35 atom % or less; Mo in a range exceeding 0 atom % and 8 atom % or less; and unavoidable impurities as a remainder, in which a microcell structure with an average particle diameter of 10 μm or less is provided at least in crystal grains of a surface layer part, a boundary part of the microcell structure has a dislocation having a surface density higher than that inside the microcell structure, and ultrafine particles having an average particle diameter of 50 nm or less are dispersed and precipitate at least inside the microcell structure. Having such a structure improves the hardness.

The following improvements or changes can be made in the above-described alloy member.

(vii) Ti is concentrated in the boundary part of the microcell structure of the parent phase. When Ti with a large atomic radius is concentrated, the lattice distortion at an atomic level becomes larger than that of the surroundings, so that dislocations can more stably remain. In addition, an effect of further inhibiting the movement of dislocations can also be expected by transforming at least a part of the concentrated Ti into ultrafine particles or other intermetallic compounds through an aging heat treatment, which is effective for increasing the hardness.

(viii) The crystal structure of the parent phase has at least one of a face-centered cubic structure or a simple cubic structure. Such a crystal structure is effective for imparting ductility required as a matrix from the viewpoint of excellent deformability. (ix) The alloy member has excellent hardness and can have a Vickers hardness of 550 HV or more. In particular, the alloy members according to the above-described production methods (ii) and (iii) includes a surface layer part having a hardness of 550 HV or more on a maternal body having a tensile strength of 1,100 MPa or more and a breaking elongation of 10% or more. A breaking elongation of 5% or more and a tensile strength of 1,500 MPa or more can be obtained also through the production method (i). The corrosion resistance is also superior to that of corrosion-resistant stainless steel. In this manner, these alloy members have excellent mechanical properties and hardness.

Hereinafter, the embodiments of the present invention will be described with reference to the drawings according to the procedure of a production method. However, the present invention is not limited to the embodiments exemplified here, and can be appropriately combined and improved within the scope not departing from the technical idea of the invention.

<Production Method of Alloy Member>

FIG. 1 is a process diagram illustrating an example of a production method of an alloy member according to an embodiment of the present invention. The production method of the present invention is characterized by an additive manufacturing step and an aging heat treatment step. Hereinafter, the embodiment of the present invention will be described in more detail for each step.

First, an alloy powder 20 having a desired HEA composition (Co—Cr—Fe—Ni—Ti-Mo) is prepared. The alloy powder 20 to be used can be obtained through, for example, an atomization method. There is no particular limitation on the atomization method, and the conventional methods can be used. For example, gas atomization methods (such as a vacuum gas atomization method and an electrode-induced dissolution type gas atomization method), centrifugal atomization methods (such as a disk atomization method and a plasma rotation electrode atomization method), and plasma atomization methods can be preferably used.

(Chemical Composition)

An HEA composition of the present invention contains 5 elements of Co, Cr. Fe, Ni, and Ti each in a range of 5 atom % or more to 35 atom % or less as main components and contains Mo in a range exceeding 0 atom % and 8 atom % or less as sub-components, the remainder being unavoidable impurities.

The chemical composition may contain 20 atom % or more and 35 atom % or less of Co, 10 atom % or more and 25 atom % or less of Cr, 10 atom % or more and 25 atom % or less of Fe, 15 atom % or more and 30 atom % or less of Ni. and 5 atom % or more and 15 atom % or less of Ti.

The chemical composition may contain 25 atom % or more and 33 atom % of Co, 15 atom % or more and 23 atom % or less of Cr, 15 atom % or more and 23 atom % or less of Fc. 17 atom % or more and 28 atom % or less of Ni, 5 atom % or more and 10 atom % or less of Ti, and 1 atom % or more and 7 atom % or less of Mo.

The chemical composition may contain 25 atom % or more and less than 30 atom % of Co, 15 atom % or more and less than 20 atom % of Cr, 15 atom % or more and less than 20 atom % of Fe. 23 atom % to 28 atom % of Ni, 7 atom % to 10 atom % of Ti, and 1 atom % to 7 atom % of Mo.

The chemical composition may contain 30 atom % or more and 33 atom % or less of Co, 20 atom % or more and 23 atom % or less of Cr, 20 atom % or more and 23 atom % or less of Fe, 17 atom % or more and less than 23 atom % of Ni. 5 atom % or more and less than 7 atom % of Ti. and 1 atom % or more and 3 atom % or less of Mo.

By controlling these composition ranges, it is more effective to achieve both improvements in ductility and tensile strength.

In the composition ranges, in a case of prioritizing the improvement in tensile strength, it is more preferable that the content of Co be 25 atom % or more and less than 30 atom %, the content of Cr be 15 atom % or more and less than 20 atom %, the content of Fe be 15 atom % or more and less than 20 atom %, the content of Ni be 23 atom % or more and 28 atom % or less, the content of Ti be 7 atom % or more and 10 atom % or less, and the content of Mo be 1 atom % or more and 7 atom % or less.

In addition, in the composition ranges, in a case of prioritizing the improvement in ductility, it is more preferable that the content of Co be 30 atom % or more and 33 atom % or less, the content of Cr be 20 atom % or more and 23 atom % or less, the content of Fe be 20 atom % or more and 23 atom % or less, the content of Ni be 17 atom % or more and less than 23 atom %, the content of Ti be 5 atom % or more and less than 7 atom %, and the content of Mo be 1 atom % or more and 3 atom % or less.

In the above-described composition ranges, as a composition particularly having excellent tensile strength and ductility, the content of Co may be 26.7 atom %, the content of Cr may be 17.9 atom %, the content of Fe may be 17.9 atom %, the content of Ni may be 26.8 atom %, the content of Ti may be 8.9 atom %, and the content of Mo may be 1.8 atom % as in a powder P1 used in examples to be shown below. In addition, the content of Co may be 28.0 atom %, the content of Cr may be 19.7 atom %, the content of Fe may be 17.6 atom %, the content of Ni may be 23.4 atom %, the content of Ti may be 8.9 atom %, and the content of Mo may be 2.4 atom % as in a powder P2. Either composition corresponds to the composition ranges in the case of prioritizing the improvement in the tensile strength, but the composition of P2 can be set to have an increased content of Co or Cr compared to P1 in consideration of the improvement of ductility.

(Powder Particle Diameter)

The average particle diameter of the alloy powder 20 is preferably 10 μm or more and 200 μm or less from the viewpoint of handleability or filling properties. Among these, a suitable average particle diameter differs depending on the additive manufacturing method used. An average particle diameter of 10 μm or more and 50 μm or less is more preferable in a selective laser melting (SLM) method and an average particle diameter of 45 μm or more and 105 μm or less is more preferable in an electron beam melting (EBM) method. In addition, an average particle diameter of 50 μm or more and 150 μm or less may be set in a laser metal deposition (LMD) method. If the average particle diameter is less than 10 μm, the alloy powder 20 is likely to fly up in the next additive manufacturing step, which may cause a decrease in the shape accuracy of an additively manufactured body of an alloy. On the other hand, if the average particle diameter exceeds 200 μm, this may cause an increase in the surface roughness of the additively manufactured body and insufficient melting of the alloy powder 20 in the next additive manufacturing step.

[Additive Manufacturing Step]

Next, an additive manufacturing step of forming an alloy additively manufactured body (hereinafter simply referred to as a shaped member) 101 having a desired shape is performed through a metal powder additive manufacturing method (hereinafter simply referred to as an additive manufacturing method) in which the alloy powder 20 prepared above is used. A shaped member having a hardness equal to or higher than that of a forging material and having a three-dimensional complex shape can be produced by applying an additive manufacturing method that shapes a near net shape alloy member through melting and solidifying. Additive manufacturing methods using an SLM method, an EBM method, and LMD method can be suitably used as the additive manufacturing method.

Figure 2:
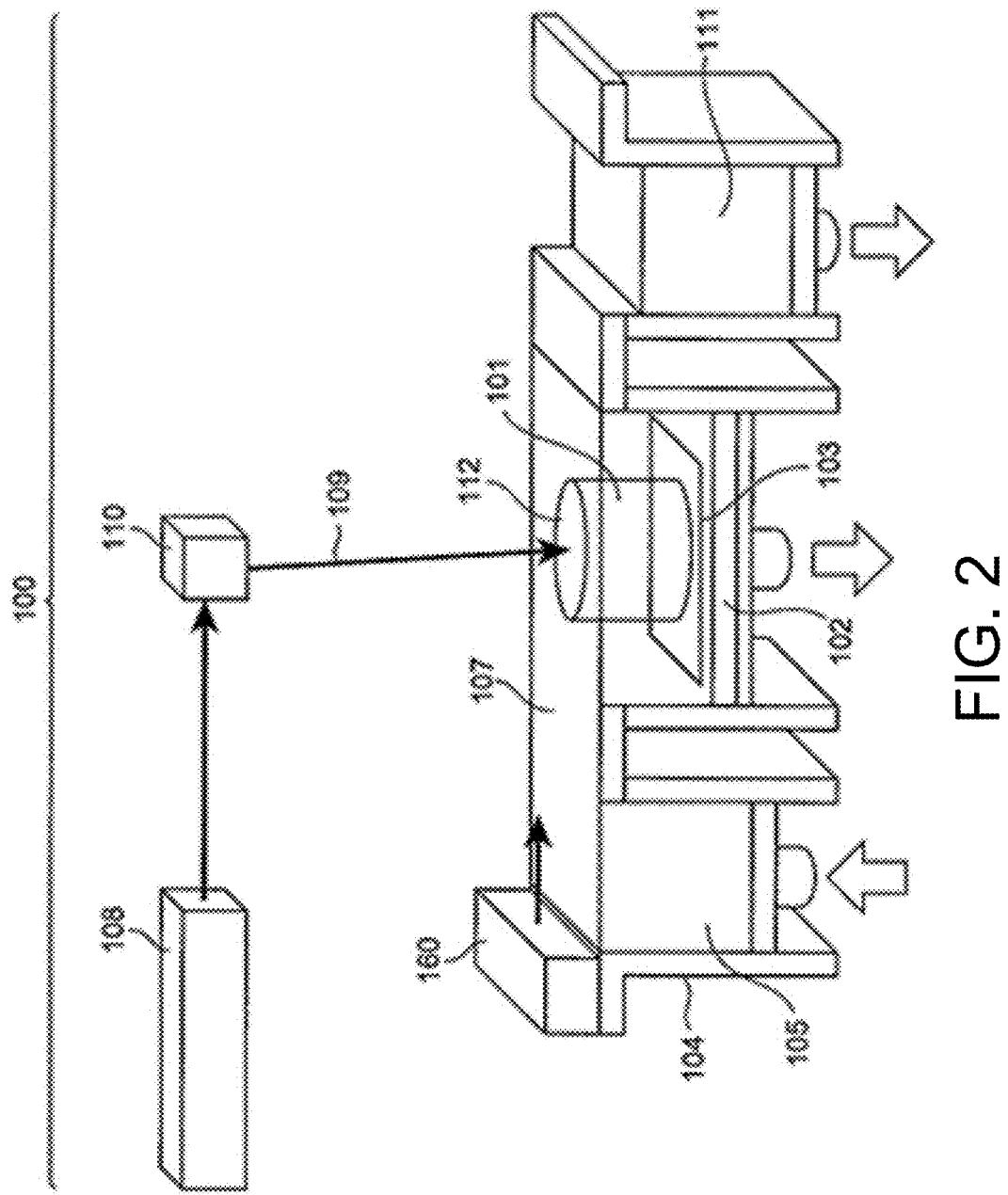
FIG. 2 is a cross-sectional schematic diagram illustrating an example of an additive manufacturing method and a configuration of an additive manufacturing device of a selective laser melting method.

Hereinafter, an additive manufacturing step performed through an SLM method will be described. FIG. 2 is a schematic diagram illustrating a configuration of a powder additive manufacturing device 100 of the SLM method. A stage 102 is lowered by the thickness of one layer (for example, about 20 to 50 μm) of a shaped member 101 to be additively manufactured. An alloy powder 105 is supplied from a powder supply container 104 onto a base plate 103 on the upper surface of the stage 102, and the alloy powder 105 is flattened by a recoater 160 to form a powder bed 107 (layered powder).

Next, unmelted powder on the base plate 103 is irradiated with a laser beam 109 output from a laser oscillator 108 through a galvanometer mirror 110 based on 2D slice data converted from 3D-CAD data of the shaped member 101 to be shaped, and a minute molten pool is formed, moved, and sequentially melted and solidified to form a 2D slice-shaped solidification layer 112. The unmelted powder is collected in a collection container 111. Laminating is performed by repeating this operation to produce the shaped member 101.

[Removal Step]

The shaped member 101 is produced integrally with the base plate 103 and is covered with unmelted powder. At the time of removal, the unmelted powder is collected after the irradiation with a laser beam is completed and the powder and the shaped member 101 are sufficiently cooled, and the shaped member 101 and the base plate 103 are removed from the powder additive manufacturing device 100. Thereafter, the shaped member 101 is cut from the base plate 103 to obtain a shaped member 101 (corresponding to a shaped member A).

Here, a sample for observing a fine structure was collected from the removed shaped member 101, and the fine structure of the sample was observed using a scanning electron microscope. As a result, the parent phase of the shaped member 101 had a structure (a so-called quenched solidification structure) in which fine columnar crystals (with an average width of 50 μm or less) stood together along a lamination direction of the shaped member 101. Upon closer observation, microcell structures with an average diameter of 10 μm or less were formed inside the fine columnar crystals. Here, the microcell structures indicate elliptical or rectangular solidification structures that appear by electrolytic etching or the like using oxalic acid or the like.

Next, an additive manufacturing step by a laser metal deposition method (LMD method) will be described.

Figure 3:
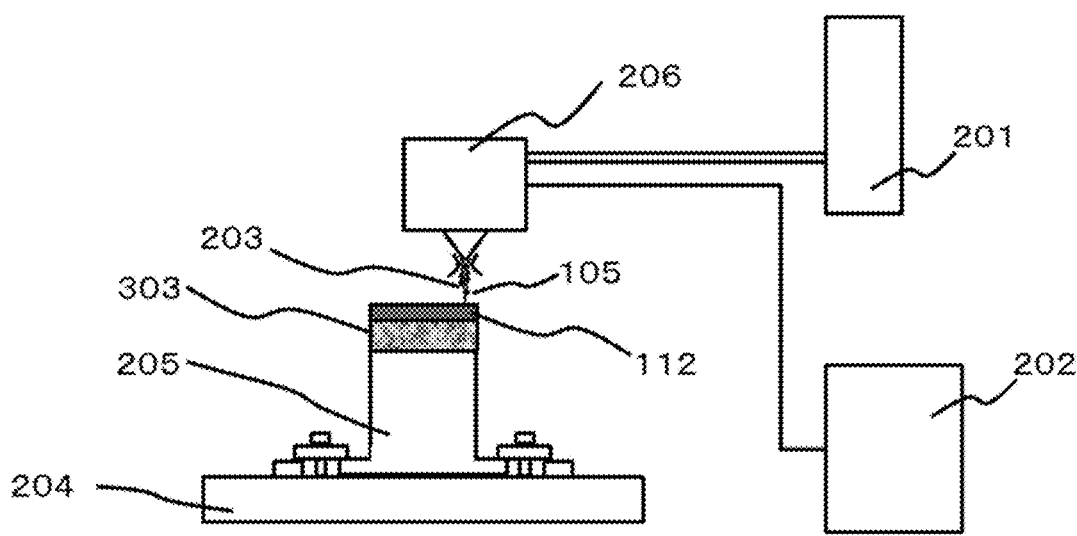
FIG. 3 is a cross-sectional schematic diagram illustrating an example of an additive manufacturing method and a configuration of an additive manufacturing device of a laser metal deposition method.

FIG. 3 is a schematic diagram illustrating a configuration of a powder additive manufacturing device 200 of the LMD method. An optical system is focused on a surface layer part of a shaped member 303 to be additively manufactured, and the alloy powder 105 is ejected and supplied from a powder supply container 201 toward a laser focal part.

At the same time, the shaped member on a base plate 205 is irradiated with a laser beam or electron beam 203 output from a laser oscillator 202 through a laser head part 206 based on an irradiation path converted from 3D-CAD data of the shaped member 303 to be shaped, and a minute molten pool is formed, moved, and sequentially melted and solidified to form a solidification layer 112 on the irradiation path. Solidification layers were laminated by advancing this operation along the irradiation path to produce a shaped member 101 (corresponding to a shaped member A). In a remelting and resolidifying step to be described below, a molten part can also be formed on the surface layer part by scanning a laser beam or an electron beam on the shaped member 303 without ejecting and supplying the alloy powder 105.

[Aging Heat Treatment Step]

Figure 4:
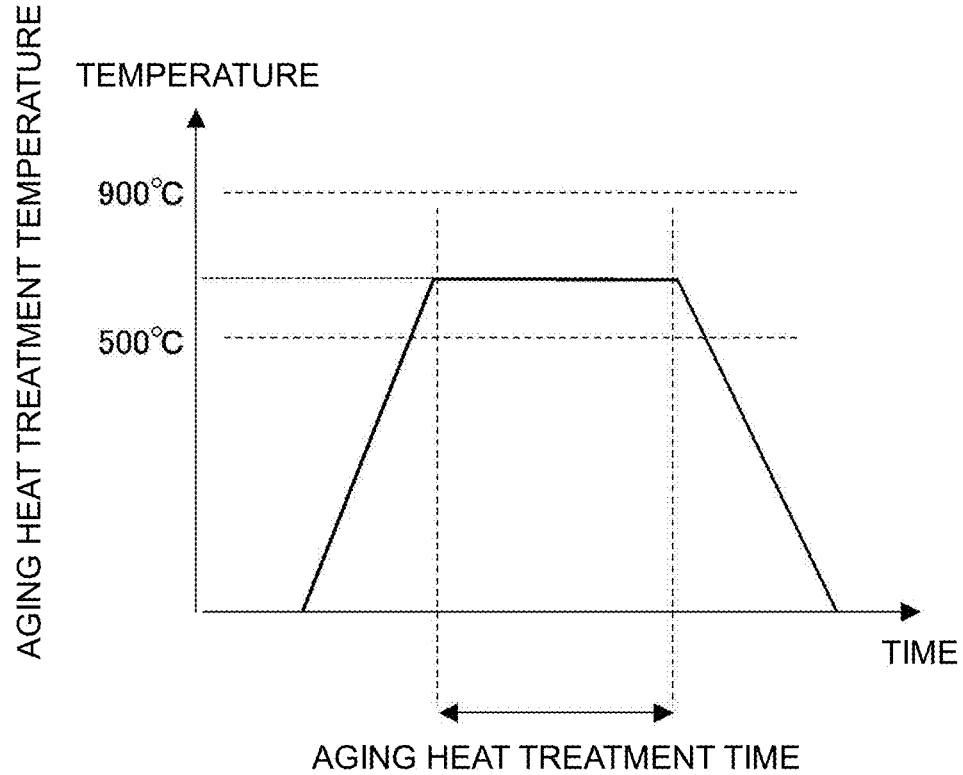
FIG. 4 is a graph illustrating an example of an aging heat treatment step after the additive manufacturing step.

An example of an aging heat treatment is shown in FIG. 4. The above-described shaped member 101 is heated by raising the temperature, and an aging heat treatment of holding the shaped member in a temperature range in which the number of ultrafine particles easily increases, for example, in a temperature range higher than 500° C. and lower than 900° C. is conducted with the purpose of increasing the hardness of the shaped member. For example, in applications such as pumps and dies to be described below, a member with almost no decrease in hardness when used in a temperature range below the temperature of an aging heat treatment can be obtained by performing the aging heat treatment at a temperature or higher than the temperature at which a shaped member is used. Members that are required to have wear resistance at a high temperature are preferably subjected to an aging heat treatment at a temperature or higher than the temperature at which the shaped members are used. In addition, when a surface treatment is applied to impart wear resistance, the surface treatment temperature is often high. In this case, an aging heat treatment is preferably performed at a temperature or higher than the surface treatment temperature. The temperature of an aging heat treatment for increasing the hardness of an additively manufactured body is preferably 600° C. or more and 850° C. or less and more preferably 650° C. or more and 800° C. or less. When the aging heat treatment temperature is higher than 500° C., an effect of improving the strength can be obtained. When the aging heat treatment temperature is lower than 900° C., formation of hexagonal precipitates can be inhibited and the ductility can be maintained. An upper limit value and a lower limit value can be arbitrarily combined. Similarly, the following numerical values can also be arbitrarily combined. The holding time may be 0.5 hours or longer and 24 hours or shorter. The holding time is preferably set to 0.5 hours or longer and 8 hours or shorter and more preferably set to 1 hour or longer and 8 hours or shorter. When the holding time is 0.5 hours or longer, the effect of improving the strength can be obtained. When the holding time is 24 hours or shorter, formation of hexagonal precipitates causing deterioration in corrosion resistance can be inhibited. By the above aging heat treatment, nanoscale ultrafine particles having an average particle diameter of 50 nm or less can be generated in a microcell structure to be described below, thereby improving the strength.

A cooling step after the aging heat treatment is not particularly limited. However, there is a possibility that nanoscale ultrafine particles may be excessively generated if the temperature is held near the aging heat treatment temperature for a long period of time. Therefore, the temperature may be cooled to room temperature through air cooling, gas cooling, or the like. In addition, FIG. 4 is merely an example, and the heat treatment pattern can be variously changed. In addition, in the process of raising the temperature in the aging heat treatment, the retention time in an intermediate temperature range at which it is difficult to adjust the precipitation amount can be shortened if the rate of temperature increase is 5° C./minute or higher, which is suitable. The temperature rising rate is preferably 10° C./minute or higher. The upper limit is not particularly limited, but is about 1000° C./minute or lower from the viewpoint of securing temperature uniformity in the shaped member 101, particularly prevention of generation of an overheated part.

(Ultrafine Particles)

As described above, in the aging heat treatment of the present invention, ultrafine particles are generated in the microcell structure having an average diameter of 10 µm or less. The average particle diameter of the ultrafine particles is 50 nm or less which is smaller than that of minute particles in parent phase crystal grains to be described below. The lower limit of the average particle diameter is not particularly limited, but is, for example, about 2 nm, preferably 3 nm, and more preferably 5 nm. The upper limit thereof is preferably about 30 nm, more preferably 20 nm, and still more preferably 10 nm. In a case where the average particle diameter of ultrafine particles is 2 nm to 50 nm, the hardness of a product can be increased. It has been found that the ductility of a product decreases in a case where the average particle diameter of ultrafine particles exceeds 50 nm. Regarding the size of ultrafine particles, an image containing the ultrafine particles is acquired by high-magnification observation means represented by transmission electron microscopy or high-resolution scanning electron microscopy, an average value of the diameters of inscribed circles and the diameters of circumscribed circles of the ultrafine particles is used as a particle diameter of the ultrafine particles, and an average value of particle diameters of 20 ultrafine particles is used as an average particle diameter.

(Fine Structure of Alloy Member)

Figure 5:
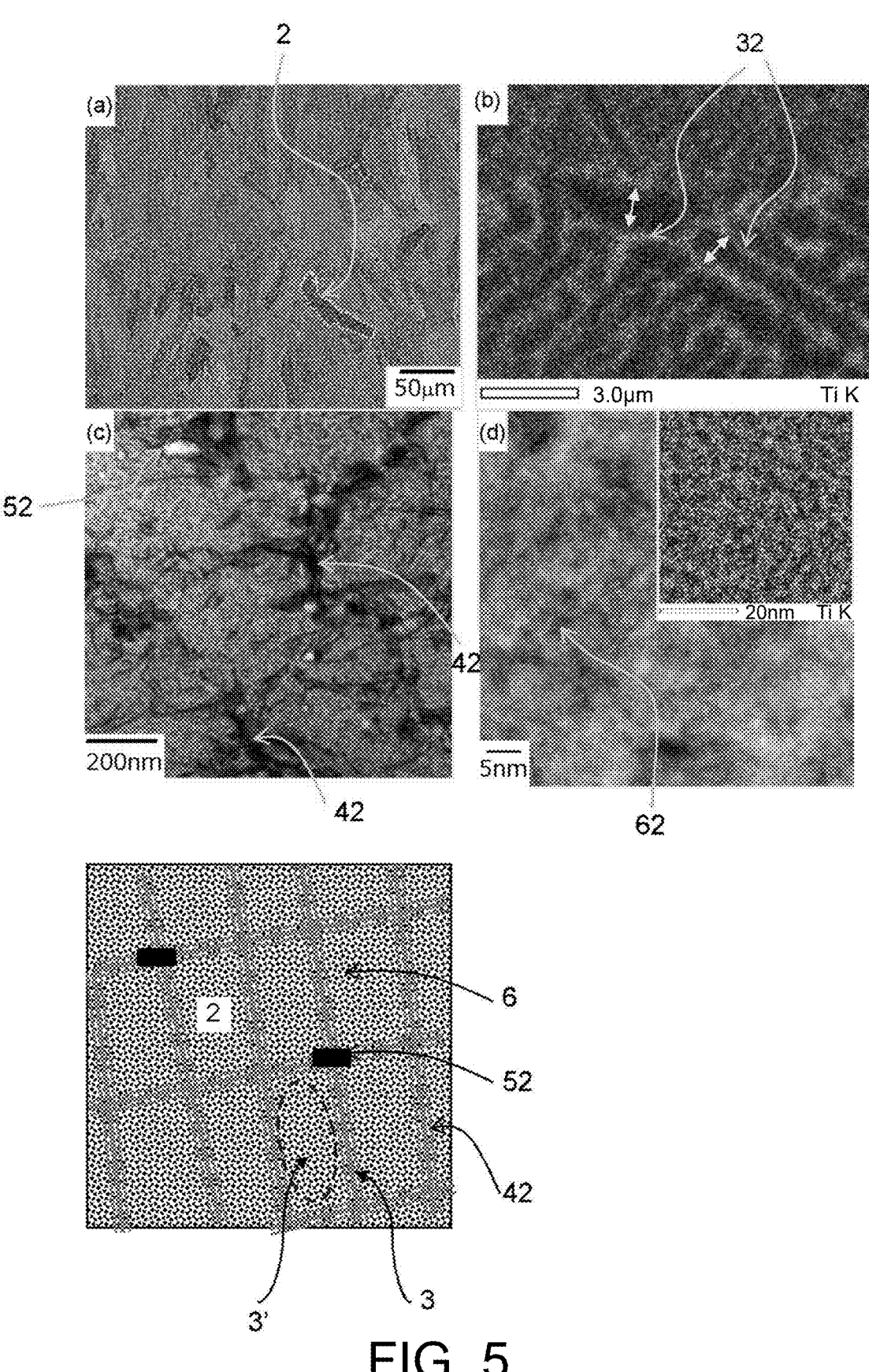
FIG. 5 shows scanning electron microscope images (SEM images) (a) and (b) and scanning transmission electron microscope images (STEM images) (c) and (d) illustrating an example of a fine structure of a first alloy member according to the present invention.

FIG. 5 illustrates an example of a fine structure of an alloy member (aging heat treatment material: M1-650AG) according to the present invention to be described below, in which (a) and (b) are scanning electron microscope images (SEM images) and (c) and (d) are scanning transmission electron microscope images (STEM images).

The alloy member of the present invention has a parent phase structure 2 mainly composed of columnar crystals having a crystal grain size of 20 µm or more and 150 µm or less (an average crystal grain size of 100 µm or less) (one structure is shown by a broken line because it is difficult to distinguish them from this view) as shown in the SEM image of (a). The average crystal grain size is an average grain size of 10 crystal grains measured through a cutting method using an SEM image of magnification of 500 times. In addition, although not shown in the SEM image of (a), microcell structures having an average diameter of 10 µm or less are formed inside the structure. It can be stated that, for example, the interval indicated by the arrow in an enlarged image of (b) indicates a diameter of a microcell structure. Moreover, the enrichment of Ti was confirmed in a boundary part 3 of the microcell structure shown by a white bright part in the SEM-EDS image of (b). In addition, in the high-magnification bright-field image of the STEM image of (c), a brighter region indicates the inside of the microcell structure and the boundary part 3 of the microcell structure includes a dislocation 4 shown by a black line having a higher density than the inside of the microcell structure. Accordingly, by confirming the concentration part where more black streaks are gathered compared to the inside of the microcell structure using the STEM image, it is possible to identify that there is a dislocation having a higher surface density than the inside of the structure. In addition, it was confirmed that a precipitate 5 containing an intermetallic compound is formed at the boundary part 3 of another microcell structure. Furthermore, ultrafine particles 6 having an average particle diameter of about 3 nm were confirmed in the high-magnification STEM image of (d). In addition, an element mapping image by STEM-EDX in this region is shown in the upper right of (d), and it was confirmed that the above-described ultrafine particles 6 were particles in which Ni and Ti were concentrated. (e) schematically illustrates a fine structure. As described above, this fine structure has a microcell structure in crystal grains of a surface layer part, and the boundary part 3 of this microcell structure has the black streak-like dislocation 4 having a higher surface density than the inside of the microcell structure. Furthermore, it was found that the microcell structure is a structure in which the ultrafine particles 6 are dispersed and precipitate.

Figure 6:
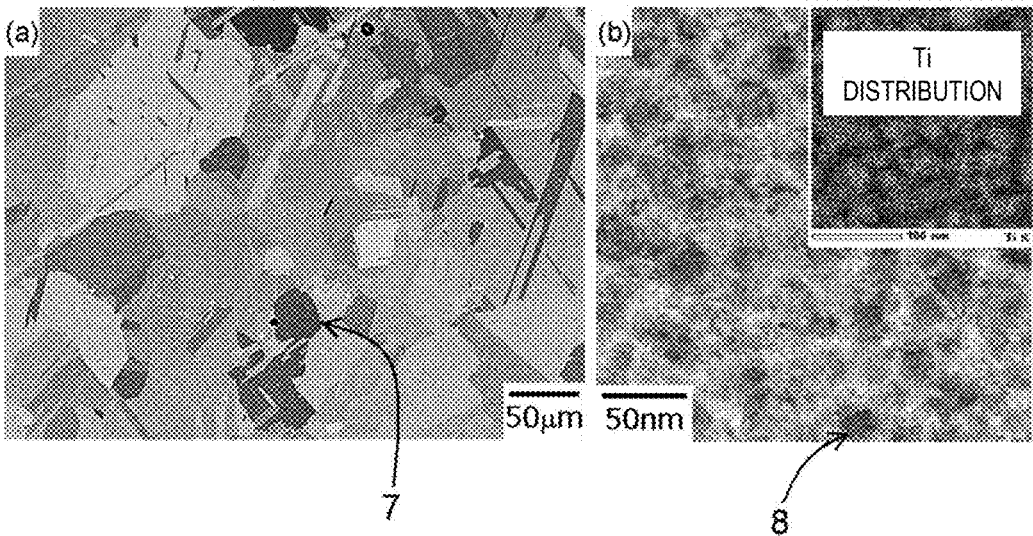
FIG. 6 shows a scanning electron microscope image (SEM image) (a) and a scanning transmission electron microscope image (STEM image) (b) illustrating an example of a fine structure of an alloy member according to a comparative example.

On the other hand, FIG. 6 illustrates an example of a fine structure of an alloy member (solution treatment material: M1-S) according to a comparative example to be described below, in which (a) is a scanning electron microscope image (SEM image) and (b) is a scanning transmission electron microscope image (STEM image).

An alloy member M1 (without a solution heat treatment nor an aging heat treatment) of a comparative example has a parent phase crystal structure mainly composed of columnar crystals having crystal grain sizes of 20 µm to 150 µm (an average crystal grain size of 100 µm or less) similarly to (a) of FIG. 5 and has microcell structures with an average diameter of 10 µm or less therein. In addition, M1-S (subjected to a solution heat treatment but no aging heat treatment) had a parent phase structure (crystal grain) 7 mainly composed of equiaxed crystals having crystal grain sizes of 50 µm to 150 µm (average crystal grain size of 100 µm or less) as shown in (a) of FIG. 6. It was confirmed that columnar crystals were recrystallized into equiaxed crystals through a solution heat treatment. In addition, as shown in (b) of FIG. 6, minute particles 8 having an average particle diameter of 20 to 30 nm were observed in the parent phase crystal grains in M1-S. An element mapping image by STEM-EDX is also shown in (b), and it was confirmed that the minute particles 8 were particles in which Ni and Ti were concentrated. In the alloy member M1, only the microcell structures having dislocations were seen, and no clear ultrafine particles having a particle diameter of 3 nm or more were observed.

[Production Method Including Remelting and Resolidifying Step]

The above-described structure in which the microcell structure and the ultrafine particles coexist is generated by directly subjecting a melt solidification structure having a microcell structure to an aging heat treatment as it is. An outline of another production method utilizing this characteristic will be described below.

Figure 7:
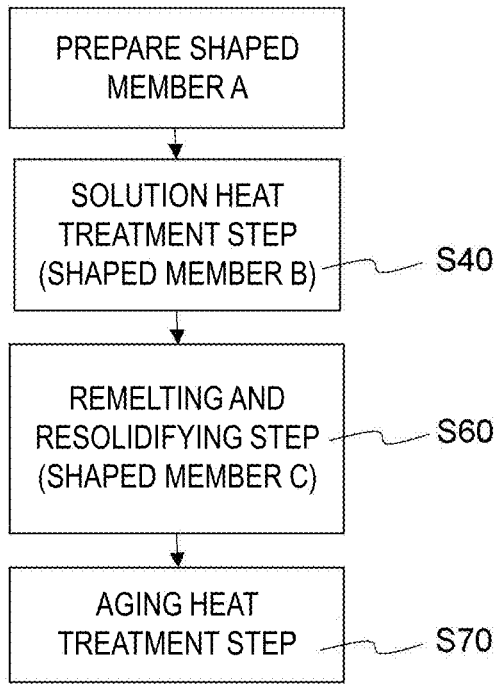
FIG. 7 is a process diagram illustrating another example of a production method of an alloy member according to the present invention.

The production method according to another embodiment of the present invention can be started by preparing a preliminarily obtained shaped member A as shown in FIG. 7. As the shaped member A, one obtained after the above-described removal step may be used, or one separately produced in advance may be used. A solution heat treatment described below is performed on the shaped member A to obtain a shaped member B having a parent phase structure mainly composed of equiaxed crystals. The surface layer of this shaped member B is melted and solidified through a laser beam or an electron beam to form a new solidification layer. As described above, a solidification layer can be formed by scanning a laser beam or an electron beam on the shaped member B without ejecting and supplying an alloy powder. Such a remelting and resolidifying step is performed to obtain a remelted and reshaped member C. This remelted and reshaped member C is obtained by forming a melt solidification structure containing a microcell structure having a diameter of 10 μm or less in a surface layer on a maternal body having excellent corrosion resistance and mechanical properties. By directly subjecting this remelted and reshaped member C to an aging heat treatment, an alloy member having superior mechanical properties such as tensile strength or ductility and improved hardness can be obtained.

[Production Method Including Surface Layer-Adding and Shaping Step]

An outline of still another production method of obtaining a structure in which ultrafine particles and a microcell structure according to the present invention coexist will be described.

Figure 8:
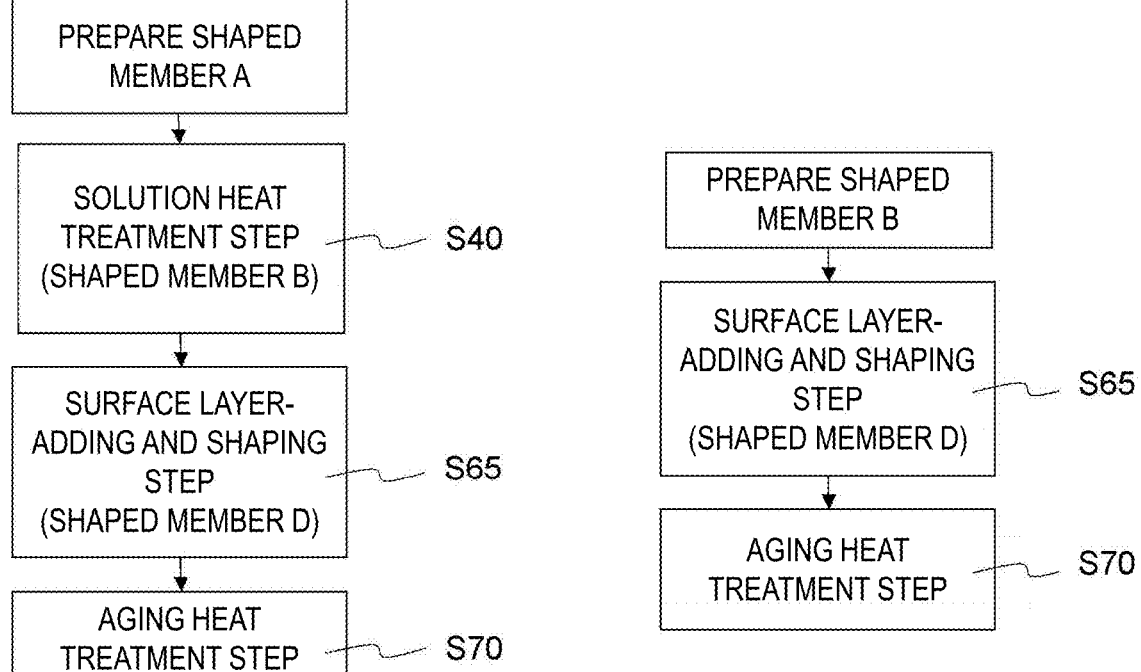
FIG. 8 is a process diagram illustrating still another example of a production method of an alloy member according to the present invention.

As shown in FIG. 8, this production method may be started by preparing a preliminarily obtained shaped member A or can also be started by preliminarily preparing a shaped member B having a parent phase structure mainly composed of equiaxed crystals due to a solution heat treatment. As the shaped member B, one obtained after the solution heat treatment step may be used, or one separately produced in advance may be used. The shaped member B is subjected to an additive manufacturing method using a laser or an electron beam, and a surface layer-adding and shaping step of forming a new solidification layer on a surface layer part thereof through melting and solidifying is performed to obtain a surface layer-added and shaped member (shaped member D). By directly subjecting this shaped member D to an aging heat treatment, an alloy member having superior mechanical properties such as tensile strength or ductility and improved hardness can be obtained.

Figure 9:
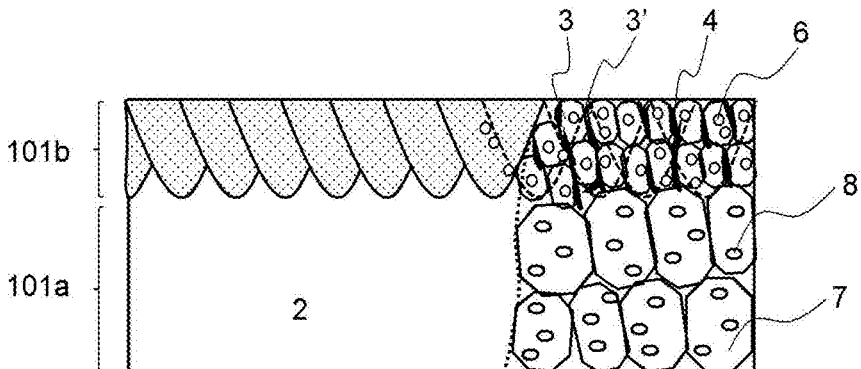
FIG. 9 is a schematic diagram illustrating an example of a cross-sectional view of a fine structure of a second alloy member (a shaped member C or a shaped member D) according to the present invention.

A second alloy member produced through the production method using the above-described remelting and resolidifying step or the surface layer-adding and shaping step has a surface layer part with an improved hardness. That is, as shown in FIG. 9, a parent phase structure mainly composed of equiaxed crystals having excellent toughness and ductility can be arranged in an inside 101a of an alloy member, and a structure where microcell structures coexist with ultrafine particles which are smaller than minute particles contained in the inside 101a of the alloy member can be provided in a surface layer part 101b. Accordingly, as described above, an alloy member having superior mechanical properties such as tensile strength or ductility and improved hardness is obtained.

[Soluble Heat Treatment]

The solution heat treatment will be described below. The holding temperature in the solution heat treatment is in a temperature range of 1080° C. to 1180° C. The holding temperature is preferably 1100° C. to 1140° C. and more preferably 1110° C. to 1130° C. If the holding temperature is 1080° C. or higher, hexagonal precipitates leading to embrittlement are unlikely to precipitate and remain. In addition, if the holding temperature is 1180° C. or lower, defects such as partial melting or coarsening of the crystal grain size are unlikely to occur. In addition, the holding time at the maximum temperature may be 0.5 hours to 24 hours, preferably 0.5 hours to 8 hours, and more preferably 1 hour to 4 hours. If the holding time is 0.5 hours or longer, the formation of hexagonal precipitates in the shaped member 101 can be inhibited. If the holding time is 24 hours or shorter, the coarsening of the crystal grain size can be inhibited.

In addition, in the temperature rising process in this solution heat treatment, if the rate of temperature increase in a temperature zone (for example, 800° C. to 1080° C.) in which hexagonal precipitates are likely to be formed is set to be fast, for example, 5° C./minute or higher, the amount of hexagonal precipitates can be reduced before the heat treatment, which is suitable. The temperature rising rate is preferably 10° C./minute or higher. The upper limit is not particularly limited, but is about 1000° C./minute from the viewpoint of securing temperature uniformity in the shaped member 101, particularly prevention of generation of an overheated part. In the present invention, since the solid solution limit of an alloy is unclear and minute particles having an average particle diameter of 100 nm or less are dispersed and precipitate in an alloy member which is a final product, the above-described heat treatment can also be referred to as a pseudo-solution heat treatment. However, in the present specification, this treatment is simply referred to as a solution heat treatment.

[Cooling Step]

Next, a cooling step is performed on a shaped member after the solution heat treatment step. In the cooling step, it is preferable to perform cooling at a cooling rate of 110° C./minute or more and 2400° C./minute or less at least in the temperature range from a holding temperature to 800° C. in a heat treatment. Here, the cooling step is performed at a cooling rate of preferably 110° C./minute or higher and lower than 600° C./minute and more preferably 200° C./minute or higher and lower than 600° C./minute. The cooling in this range can be adjusted by gas cooling using inert gases, for example, nitrogen, argon, and helium. In addition, there is also an embodiment in which the cooling step is performed at a cooling rate of 600° C./minute or more and 2400° C./minute or less and more preferably 1000° C./minute or more and 2000° C./minute or less. The cooling in this range can be adjusted by a liquid cooling using, for example, a salt bath, a quenching oil, and a aqueous polymer solution. At a cooling rate of lower than 110° C./minute (for example, furnace cooling or air cooling treatment), hexagonal precipitates are likely to be produced from grain boundaries, which may cause a problem of deterioration in corrosion resistance. In addition, at a cooling rate of exceeding 2400° C./minute (for example, immersion cooling in a water tank), deformation of a shaped member due to temperature unevenness that occurs during rapid cooling may be problematic. In addition, it is preferable to continue cooling even at a temperature of 800° C. or lower. For example, it is preferable to continuously perform cooling in a temperature range from 700° C. to room temperature at the above-described approximate cooling rate.

[Application and Product]

Applications and Products using the alloy member of the present invention are arbitrary. Mechanical properties and wear resistance can be obtained according the applications by appropriately selecting a production method, for example, subjecting an additively manufactured body to an aging heat treatment and subjecting an additively manufactured body to a solution heat treatment and an aging heat treatment. In addition, a shaped member A or a shaped member B can be separately produced and prepared. Since the shaped member A or the shaped member B can be appropriately used according to a desired product or production time, production management can be rationalized and the product can be produced at low cost.

Examples of applications include impellers of fluid machines, screws of injection molding machines, screws or cylinders of oil well drilling device or for injection molding, turbine wheels of generators or the like, impellers of compressors, valves or joints of chemical plants, heat exchangers, pumps, semiconductor manufacturing devices or members, and various dies such as casting dies, forging dies, press dies, and plastic molding dies. In the present invention, these machines, devices, members, dies, part, and the like are collectively referred to as products.

EXAMPLES

Hereinafter, the present invention will be described more specifically with reference to examples and comparative example. However, the present invention is not limited to these examples.

Experiment 1

(Production of HEA Powders P1 and P2)

Raw materials were mixed with each other according to the nominal compositions shown in Table 1, and alloy powders were produced from molten metal through a vacuum gas atomization method. Next, the obtained alloy powders were classified using a sieve and sorted so that the particle diameters were 10 μm or more and 53 μm or less and the average particle diameter (d50) was about 35 μm to prepare HEA powders P1 and P2. The reason why the compositions of P1 and P2 were selected is because they had excellent mechanical properties particularly relating to strength and ductility in the preliminary studies by the inventors. Powders and the like having compositions disclosed in PCT International Publication No. WO 2019/031577 described above can also be used, for example.

TABLE 1

| Nominal compositions (unit: atom %) of HEA powders P1 and P2 | | | | | | |
| --- | --- | --- | --- | --- | --- | --- |
| HEA powders | Co | Cr | Fe | Ni | Ti | Mo |
| P1 | 26.7 | 17.9 | 17.9 | 26.8 | 8.9 | 1.8 |
| P2 | 28.0 | 19.7 | 17.6 | 23.4 | 8.9 | 2.4 |

Experiment 2

<Production of Alloy Members M1(M2), M1(M2)-500AG, M1(M2)-600AG, M1(M2)-650AG, M1(M2)-700AG, M1(M2)-800AG, M1(M2)-900AG, and M1(M2)-S>

Regarding the HEA powder P1 prepared in Experiment 1, a shaped member M1 (additively manufactured body: a prismatic material of 25 mm×25 mm×10 mm height, the height direction being a lamination direction) was additively manufactured through an SLM method according to the procedure of the additive manufacturing step of FIG. 1 using the powder additive manufacturing device (EOS M290 manufactured by EOS) as shown in FIG. 2. The laser output during the additive manufacturing was set to 300 W based on preliminary studies by the inventors, the laser scanning speed was set to 1000 mm/second, and the scanning interval was set to 0.11 mm. In addition, the lamination thickness for each layer was set to about 0.04 mm.

After an additive manufacturing step S30 and a removal step S50, the shaped member M1 (corresponding to the shaped member A) was obtained. This shaped member M1 was subjected to various heat treatments to produce alloy members.

First, the shaped member M1 was subjected to an aging heat treatment as it was. In an aging heat treatment step S70, a sample obtained by increasing the temperature at a rate of temperature increase of 10° C./minute and holding the temperature at 500° C. for 8 hours using a vacuum furnace, and then performing cooling using high-pressure nitrogen gas at a set pressure of 0.5 MPa was regarded as M1-500AG. Similarly, samples obtained by holding the temperature at 600° C., 650° C., 700° C., 800° C., and 900° C. for 8 hours, and then similarly performing cooling using nitrogen gas were regarded as M1-600AG. M1-650AG, M1-700AG, M1-800AG, and M1-900AG.

Next, the shaped member M1 was subjected to only a solution heat treatment. In the solution heat treatment step, a sample obtained by increasing the temperature at a rate of temperature increase of 10° C./minute and holding the temperature at 1120° C. for 1 hour using a vacuum furnace, and then performing cooling using high-pressure nitrogen gas at a set pressure of 0.5 MPa was regarded as M1-S (corresponding to the shaped member B).

Furthermore, regarding the HEA powder P2, a shaped member M2 (corresponding to the shaped member A) was obtained through the additive manufacturing step S30 and the removal step S50 in the same manner as above. The aging heat treatment step S70 was performed on the shaped member M2 to produce M2-500AG, M2-600AG. M2-650AG, M2-700AG, M2-800AG, and M2-900AG. In addition, only a solution heat treatment was performed on the shaped member M2 to produce M2-S (corresponding to the shaped member B).

<Production of Alloy Member M1(M2)-RM650AG>

The previously obtained M1-S (corresponding to the shaped member B) was irradiated with a laser beam under the same conditions as above without supplying powder, and a remelting and resolidifying step S60 of melting the surface layer thereof by only one layer to shape a new melt solidification layer was performed to obtain a shaped member (corresponding to the shaped member C). Thereafter, a sample obtained by performing the aging heat treatment step S70 in which the temperature was increased at a rate of temperature increase of 10° C./minute, held at 650° C. for 8 hours using a vacuum furnace, and then cooled using high-pressure nitrogen gas at a set pressure of 0.5 MPa was regarded as M1-RM650AG. Furthermore, M2-RM650AG was produced by performing the remelting and resolidifying step S60 and the aging heat treatment step S70 on M2-S in the same manner as above.

<Production of Alloy Member M1(M2)-LD650AG>

The previously obtained M1-S (corresponding to the shaped member B) was subjected to a laser metal deposition method (LMD method) in which the P1 powder was used, and a surface layer-adding and shaping step S65 of additively manufacturing only one layer of a new melt solidification layer on a surface layer part thereof was performed to obtain a shaped member (corresponding to the shaped member D). Regarding the shaping conditions, the laser output was set to 1.0 kW, the scanning speed was set to 1000 mm/minute, the scanning interval was set to 2.0 mm, and the amount of powder supplied was set to 14 g/minute. Thereafter, a sample obtained by performing the aging heat treatment step S70 in which the temperature was increased at a rate of temperature increase of 10° C./minute, held at 650° C. for 8 hours using a vacuum furnace, and then cooled using high-pressure nitrogen gas at a set pressure of 0.5 MPa was regarded as M1-LD650AG. Furthermore, M2-LD650AG was produced by performing the surface layer-adding and shaping step S65 and the aging heat treatment step S70 on M2-S in the same manner as above using the HEA powder P2. Although the number of new melt solidification layers was only one here, lamination of two layers or more can be performed by performing the same surface layer-adding and shaping step plural times.

Experiment 3

(Observation of Fine Structure of Alloy Member)

Test pieces for fine structure observation were collected from various alloy members produced above, and the fine structure observation was performed through the above-described technique using various electron microscopes (SEM, STEM, and STEM-EDX) and an optical microscope. Production specifications of the alloy members and fine structure observation results are shown in Table 2. In each sample, parent phases contained FCC.

TABLE 2

| Alloy member | Powder | Solution heat treatment | Aging heat treatment (temperature × time) | Crystal grain size (μm) | Microcell structure | | | | Maternal body structure |
|---|---|---|---|---|---|---|---|---|---|
| | | | | | Cell diameter (μm) | Ultrafine particle diameter (μm) | Presence or absence of Ti concentration at boundary | | Minute particle diameter (μm) |
| M1 | P1 | None | None | 40 | 2 | — | Present | | — |
| M1-500AG | | | 500° C. for 8 hours | 40 | 2 | | Present | | — |
| M1-600AG | | | 600° C. for 8 hours | 40 | 2 | 2 | Present | | — |
| M1-650AG | | | 650° C. for 8 hours | 40 | 2 | 3 | Present | | — |
| M1-700AG | | | 700° C. for 8 hours | 50 | 2 | 10 | Present | | — |
| M1-800AG | | | 800° C. for 8 hours | 85 | 3 | 30 | Present | | — |
| M1-900AG | | | 900° C. for 8 hours | 120 | (Disappeared) | 70 | Absent | | — |
| M1-S | | Done (1120° C. × 1 hour) | None | 80 | (Disappeared) | — | Absent | | 80 |
| M1-RM650AG | | | 650° C. for 8 hours | (Surface layer) 70 (Inside) 80 | (Surface layer) 8 (Inside) disappeared | (Surface layer) 10 | (Surface layer) present (Inside) absent | | 80 |
| M1-LD650AG | | | 650° C. for 8 hours | (Surface layer) 70 (Inside) 80 | (Surface layer) 8 (Inside) disappeared | (Surface layer) 10 | (Surface layer) present (Inside) absent | | 80 |
| M2 | P2 | None | None | 45 | 1 | — | Present | | — |
| M2-500AG | | | 500° C. for 8 hours | 45 | 1 | — | Present | | — |
| M2-600AG | | | 600° C. for 8 hours | 45 | 1 | 3 | Present | | — |
| M2-650AG | | | 650° C. for 8 hours | 45 | 1 | 3 | Present | | — |
| M2-700AG | | | 700° C. for 8 hours | 45 | 1 | 3 | Present | | — |
| M2-800AG | | | 800° C. for 8 hours | 95 | 2 | 25 | Present | | — |
| M2-900AG | | | 900° C. for 8 hours | 150 | (Disappeared) | 80 | Absent | | — |
| M2-S | | Done (1120° C. × 1 hour) | None | 90 | (Disappeared) | — | Absent | | 50 |
| M2-RM650AG | | | 650° C. for 8 hours | (Surface layer) 80 (Inside) 90 | (Surface layer) 8 (Inside) disappeared | (Surface layer) 10 | (Surface layer) present (Inside) absent | | 50 |

TABLE 2-continued

| Alloy member | Powder | Solution heat treatment | Aging heat treatment (temperature × time) | Crystal grain size (μm) | Cell diameter (μm) | Ultrafine particle diameter (μm) | Presence or absence of Ti concentration at boundary | Maternal body structure / Minute particle diameter (μm) |
|---|---|---|---|---|---|---|---|---|
| | | | | | Microcell structure | | | |
| M2-LD650AG | | | 650° C. for 8 hours | (Surface layer) 80 (Inside) 90 | (Surface layer) 8 (Inside) disappeared | (Surface layer) 10 | (Surface layer) present (Inside) absent | 50 |

Note 1:
Average values are shown for the crystal grain size, the cell diameter, and the ultrafine particle diameter.
Note 2:
The inside shows average values of the crystal grain size and the minute particle diameter in a shaped body which becomes a maternal body.

As shown in Table 2, the parent phase structures of the alloy members M1 and M2 which had not been subjected to an aging heat treatment had a structure (so-called locally quenched solidification structure) in which fine columnar crystals having an average crystal grain size of 100 μm or less stood together along a lamination direction of additively manufactured bodies. The columnar crystals referred to herein are defined as crystals in which the ratio of the major axis length of a crystal grain to the minor axis length is 2 or more. Microcell structures having a diameter of 10 μm or less were formed inside crystal grains. In addition, looking at M1-500AG, M1-600AG, M1-650AG, M1-700AG, M1-800AG, M1-900AG, M2-500AG, M2-600AG, M2-650AG, M2-700AG. M2-800AG, and M2-900AG obtained by subjecting these alloy members M1 and M2 to an aging heat treatment, although the parent phase structures were substantially composed of columnar crystals and had microcell structures, the microcell structures disappeared during the aging heat treatment at 900° C. and the diameter of ultrafine particles in crystal grains also exceeded 50 nm.

In addition, in M1-S and M2-S obtained by subjecting the alloy members M1 and M2 to only a solution heat treatment, although ultrafine particles in crystal grains precipitated, microcell structures disappeared and crystal grains were changed into polygonal equiaxed crystals.

Furthermore, in M1-RM650AG and M2-RM650AG obtained by remelting surface layers of the alloy members M1-S and M2-S, to provide a new melt solidification layer thereon, and further performing an aging heat treatment, although fine particles precipitated therein, microcell structures disappeared and became equiaxed crystals. However, the melt solidification layer on the surface layer was composed of columnar crystals, had microcell structures, and also had ultrafine particles precipitating.

In addition, the same results were obtained for M1-LD650AG and M2-LD650AG obtained by providing a new melt solidification layer on the alloy members M1-S and M2-S through additive manufacturing and further performing an aging heat treatment. It was confirmed by TEM and STEM-EDX that minute particles having an average particle diameter of 100 nm or less were formed in the crystal grains inside the alloy members M1-S, M2-S, M1-RM650AG, M1-LD650AG, M2-RM650AG, and M2-LD650AG. Furthermore, it was confirmed by STEM-EDX that more Ni and Ti components were concentrated in the minute particles than in parent phase crystals.

Experiment 4

(Measurement of Tensile Strength and Breaking Elongation)
M1, M1-S, M1-650AG, M2, M2-S, and M2-650AG were selected from the above-described test pieces, and tensile test pieces (parallel part diameter of 6 mm, length between gauge points of 24 mm) conforming to the standard test (ASTM E8) were produced based on the materials produced through the technique shown above. Tensile tests at room temperature (22° C.) were performed at N=3 on the tensile test pieces, and average values of the tensile strength and the breaking elongation were obtained and shown in Table 3. From Table 3, it was confirmed that a tensile strength of 1,100 MPa or more and a breaking elongation of 5% or more were obtained in all of the test pieces. Among these, it was confirmed that a tensile strength of 1,500 MPa or more was obtained from the test pieces of M1-650AG and M2-650AG.

TABLE 3

| Alloy member | Tensile strength (MPa) | Breaking elongation (%) |
|---|---|---|
| M1 | 1,264 | 31 |
| M1-S | 1,466 | 32 |
| M1-650AG | 1,796 | 5 |
| M2 | 1,354 | 26 |
| M2-S | 1,450 | 36 |
| M2-650AG | 1,832 | 6 |

(Measurement of Wear Resistance)
The Vickers hardness (load: 4.9 N, indentation time: 10 seconds) was measured for the cross-sectional test pieces of the alloy members produced above. 5 points in the plane of each test piece were measured, and each average value was obtained and shown in Table 4. The hardness was based on a hardness of 550 HV required for wear resistant parts in resource mining environments and the like, and a hardness of 550 HV or more was determined to be "acceptable" and a hardness less than 550 HV was determined to be "unacceptable". 550 HV is a value required for securing wear resistance, and is a numerical value that can be sufficiently put into practical use in a normal environment. Regarding M1-LD650AG, M1-RM650AG, M2-LD650AG, and M2-RM650AG, the hardness was measured separately for a remelted part or a padding part of a surface layer part and the inside, and the acceptance was determined by the hardness of the surface layer part where wear resistance is required.
(Measurement of Corrosion Resistance)
Immersion test pieces (25 mm long×25 mm wide×2 mm thick) for immersion tests in boiling 10% sulfuric acid were collected from the alloy members produced above. An immersion test in boiling sulfuric acid is a test that is additionally performed especially for members used in strongly acidic atmospheres such as resource mining environments or chemical plants, and is performed for evaluating further enhanced corrosion resistance. In the immersion test, the test area for each test piece was 14.5 cm², a test equipment was a glass flask (capacity: 1,000 mL) to which backflow water-cooled glass capacitor was connected, a test solution was a 10% sulfuric acid aqueous solution (about 10 mL for 1 cm² of a surface area of each test piece).

Regarding the test temperature, the weight reduction amount after immersion for 24 hours under boiling conditions was obtained and was used as an index of corrosion rate (mm/year) using an alloy density (8.04 g/cm³). In the evaluation of the corrosion resistance, a corrosion rate of 5 mm/year or low in boiling sulfuric acid was determined to be "acceptable", and a case where the corrosion rate exceeded 5 mm/year was determined as "unacceptable". Although the case where the corrosion rate exceeded 5 mm/year was determined as "unacceptable", it is a numerical value that can be sufficiently put into practical use in a normal environment. The results of the above corrosion tests are also shown in Table 4.

showed the same characteristics as those of M1 and M2, respectively. There was only a small change in hardness from M1 and M2 because ultrafine particles did not precipitated, and the hardness was less than 550 HV. On the other hand, the alloy members M1-900AG and M2-900AG were unacceptable because the corrosion rate exceeded 5 mm/year. It is thought that this is because ultrafine particles are transformed into hexagonal precipitates, which are coarse and have poor corrosion resistance, during an aging heat treatment at high temperature and are increased in size exceeding 50 nm.

Figure 10:
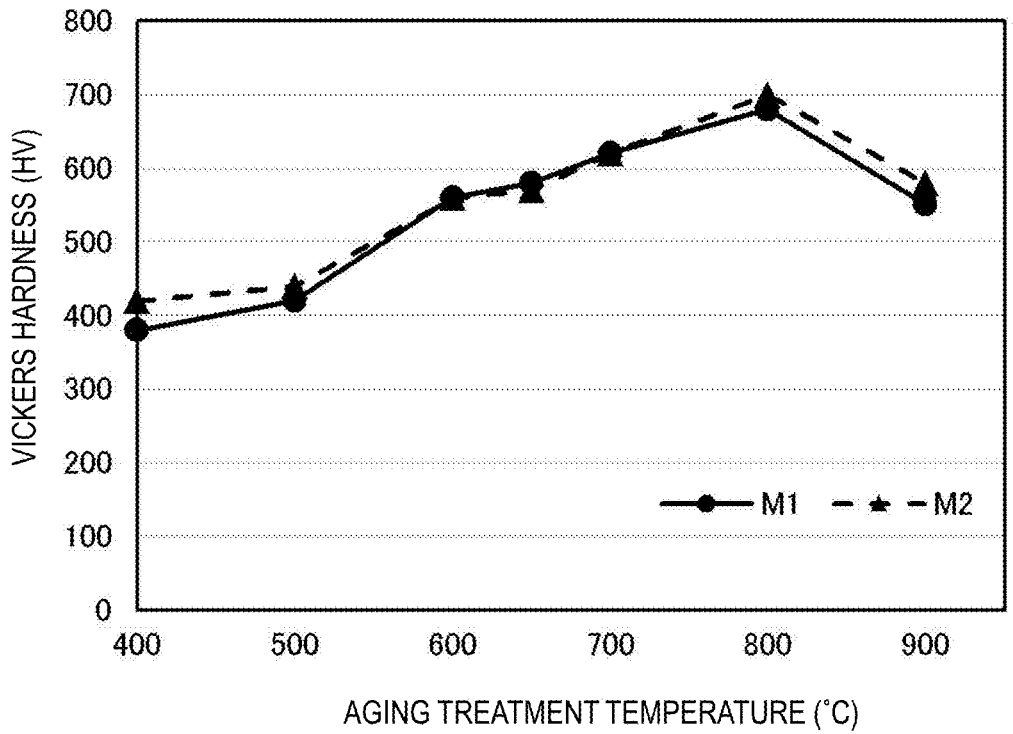
FIG. 10 is a graph illustrating a relationship between the hardness and the aging heat treatment temperature according to the present invention.

On the other hand, it was demonstrated that the hardness of surface layers of other alloy members (examples) exceeded 550 HV which was favorable. In addition, the corrosion resistance was also suitable because it was well below the standard value of 5 mm/year. In addition, the relationship between the aging heat treatment temperature and the hardness is shown in FIG. 10. It can be seen from the drawing that a hardness of 550 HV or more is obtained when the aging temperature is 550° C. or higher and that the hardness tends to be maximum at near 800° C. In addition, regarding the remelted and reshaped members (M1-RM650AG and M2-RM650AG) and the surface layer-added and shaped members (M1-LD650AG and M2-LD650AG),

TABLE 4

| Alloy member | Wear resistance | | Corrosion resistance | |
| --- | --- | --- | --- | --- |
| | Vickers hardness (HV) | Determination of acceptance | Corrosion rate (mm/year) in boiling 10% sulfuric acid | Determination of acceptance |
| MIA | 380 | Unacceptable | 4.5 | Acceptable |
| M1-500AG | 420 | Unacceptable | 4.5 | Acceptable |
| M1-600AG | 560 | Acceptable | 3.0 | Acceptable |
| M1-650AG | 580 | Acceptable | 2.2 | Acceptable |
| M1-700AG | 620 | Acceptable | 2.1 | Acceptable |
| M1-800AG | 680 | Acceptable | 4.0 | Acceptable |
| M1-900AG | 550 | Acceptable | 9.5 | Unacceptable |
| M1-S | 450 | Unacceptable | 1.8 | Acceptable |
| M1-RM650AG | (Surface) 580 (Inside) 510 | Acceptable — | 3.0 | Acceptable |
| M1-LD650AG | (Surface) 570 (Inside) 510 | Acceptable — | 3.5 | Acceptable |
| M2 | 420 | Unacceptable | 1.2 | Acceptable |
| M2-500AG | 440 | Unacceptable | 1.4 | Acceptable |
| M2-600AG | 560 | Acceptable | 1.7 | Acceptable |
| M2-650AG | 570 | Acceptable | 1.9 | Acceptable |
| M2-700AG | 620 | Acceptable | 1.9 | Acceptable |
| M2-800AG | 700 | Acceptable | 2.2 | Acceptable |
| M2-900AG | 580 | Acceptable | 6.5 | Unacceptable |
| M2-S | 440 | Unacceptable | 0.4 | Acceptable |
| M2-RM650AG | (Surface) 570 (Inside) 460 | Acceptable — | 2.3 | Acceptable |
| M2-LD650AG | (Surface) 560 (Inside) 470 | Acceptable — | 2.5 | Acceptable |

The evaluation results of the test pieces and determination of acceptance are shown in Table 4 and FIG. 10. First, it was confirmed that the alloy members M1 and M2 which were samples that had not undergone a heat treatment step had a hardness of less than 550 HV and are not suitable for application to an environment where high wear resistance is required. In addition, it was also confirmed that M1-S and M2-S that had undergone only a solution heat treatment similarly had a hardness of less than 550 HV. However, since M1-S and M2-S has a tensile strength of 1,100 MPa or more and a breaking elongation of 10% or more, they can be sufficiently put into practical use in applications or sites where no high wear resistance is required. In addition, the alloy members M1-500AG and M2-500AG basically new cured layers were obtained in surface layer parts and a structure composed of equiaxed crystals with excellent ductility was maintained inside the members. It was confirmed that a ductility of 20% or more was maintained inside these members and that these members are particularly suitable for applications, such as dies, requiring all of surface hardness, ductility, and toughness.

The above-described embodiments and examples have been described for assisting the understanding of the present invention, and the present invention is not limited to only the specific configuration described. For example, a part of a configuration of a certain embodiment can be replaced with a configuration of another embodiment, and a configuration of a certain embodiment can be added to a configuration of the other embodiment. That is, in the present invention, a part of the configurations of the embodiments or the examples of the present specification can be deleted and replaced with another configuration, and another configuration can be added thereto. By such adjustment of embodiments, the alloy members disclosed in the present invention can be applied to corrosion- and wear-resistant components widely used in industrial fields, resource fields, chemical plants, and die members.

The invention claimed is:

1. A production method of an alloy member comprising:

an additive manufacturing step of forming a shaped member through an additive manufacturing method using an alloy powder containing elements Co, Cr, Fe, Ni, and Ti each in a range of 5 atom % or more to 35 atom % or less and containing Mo in a range exceeding 0 atom % and 8 atom % or less, the remainder being unavoidable impurities; and an aging heat treatment step of holding the shaped member obtained through the additive manufacturing step in a temperature range higher than 500° C. and lower than 900° C. in a state where a melt solidification structure comprises microcell structure, which are cell-shaped regions finely separated by a network of dislocations, and each cell-shaped region has an average diameter of 10 μm or less and is provided at least in crystal grains of a surface layer part of the shaped member, the shaped member which has been additively manufactured is directly subjected to the aging heat treatment without undergoing a solution heat treatment step.

2. The production method of an alloy member according to claim 1, wherein, in the additive manufacturing step, a heat source used in the additive manufacturing method is a laser beam or an electron beam.

3. The method according to claim 1, wherein a holding time of the aging heat treatment step is 0.5 hours or longer and 24 hours or shorter.

* * * * *